United States Patent
Depalov et al.

(10) Patent No.: US 9,479,679 B2
(45) Date of Patent: Oct. 25, 2016

(54) CAPTURING A SCAN LINE WITH TWO COLORS

(75) Inventors: Dejan Depalov, Boise, ID (US); Craig T Johnson, San Diego, CA (US); Kenneth K Smith, Boise, ID (US); Baris Efe, San Diego, CA (US); Jerry Wagner, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/397,610

(22) PCT Filed: May 22, 2012

(86) PCT No.: PCT/US2012/038988
§ 371 (c)(1),
(2), (4) Date: Oct. 28, 2014

(87) PCT Pub. No.: WO2013/176653
PCT Pub. Date: Nov. 28, 2013

(65) Prior Publication Data
US 2015/0124300 A1     May 7, 2015

(51) Int. Cl.
*H04N 1/04* (2006.01)
*H04N 1/48* (2006.01)
*H04N 1/40* (2006.01)
*H04N 1/028* (2006.01)

(52) U.S. Cl.
CPC .............. *H04N 1/48* (2013.01); *H04N 1/0282* (2013.01); *H04N 1/40056* (2013.01); *H04N 2209/04* (2013.01)

(58) Field of Classification Search
CPC ........... H04N 1/40056; H04N 1/0282; H04N 2209/04

USPC .................................. 358/1.9, 505, 509, 474
See application file for complete search history.

(56) References Cited

U.S. PATENT DOCUMENTS

| | | | |
|---|---|---|---|
| 4,658,289 A * | 4/1987 | Nagano | H04N 1/484 348/269 |
| 7,907,309 B2 | 3/2011 | Smith et al. | |
| 8,144,375 B2 | 3/2012 | Tanimoto et al. | |
| 2002/0030837 A1* | 3/2002 | Hokoi | H04N 1/401 358/1.9 |
| 2003/0025073 A1 | 2/2003 | Liu et al. | |
| 2006/0238830 A1 | 10/2006 | Dikeman | |
| 2009/0296172 A1 | 12/2009 | Iwatsuka et al. | |

FOREIGN PATENT DOCUMENTS

| | | |
|---|---|---|
| CN | 1647920 | 8/2005 |
| JP | 2002290677 | 10/2002 |

(Continued)

OTHER PUBLICATIONS

Hirakawa K. et al. Adaptive Homogeneity-directed Demosaicing Algorithm, IEEE Transactions on Image Processing, vol. 14, No. 3, Mar. 2005, 10 pages.

(Continued)

*Primary Examiner* — Houshang Safaipour
(74) *Attorney, Agent, or Firm* — HP Inc Patent Department

(57) ABSTRACT

A scanner is disclosed. The scanner has three lights with three different colors. The scanner uses only two of the three lights when capturing each scan line. The scanner does this by alternating the use of two of the three colors every other scan line.

8 Claims, 1 Drawing Sheet

(56) References Cited

FOREIGN PATENT DOCUMENTS

| | | |
|---|---|---|
| JP | 2006014178 | 1/2006 |
| JP | 2009094604 | 4/2009 |
| JP | 2010136061 | 6/2010 |
| JP | 4630481 | 2/2011 |

OTHER PUBLICATIONS

International Searching Authority, International Search Report and the Written Opinion, Dec. 28, 2012, 9 pages.

* cited by examiner

CAPTURING A SCAN LINE WITH TWO COLORS

BACKGROUND

Scanners come in a variety of types. Some scanners have sensor arrays that have three lines of sensors that scan three colors at the same time. Each of the three lines of sensors has a different color filter. These types of scanners typically use a light source that illuminates the object to be scanned with broad spectrum light. The broad spectrum light is typically a florescent bulb with three different phosphors, or a white LED. Other types of scanners may use a single unfiltered line of sensors that can detect a broad band of light frequencies (typically known as a broadband sensor). This type of scanner uses three different light sources, typically a red, green and blue light emitting diode (LED). The LED's are alternately poised to illuminate each scan line with the three different colors.

DETAILED DESCRIPTION

Figure 1:
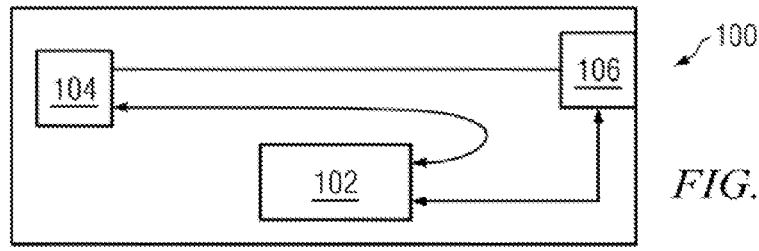
FIG. 1 is a block diagram of scanner 100 in as example embodiment of the invention.
Figure 2:
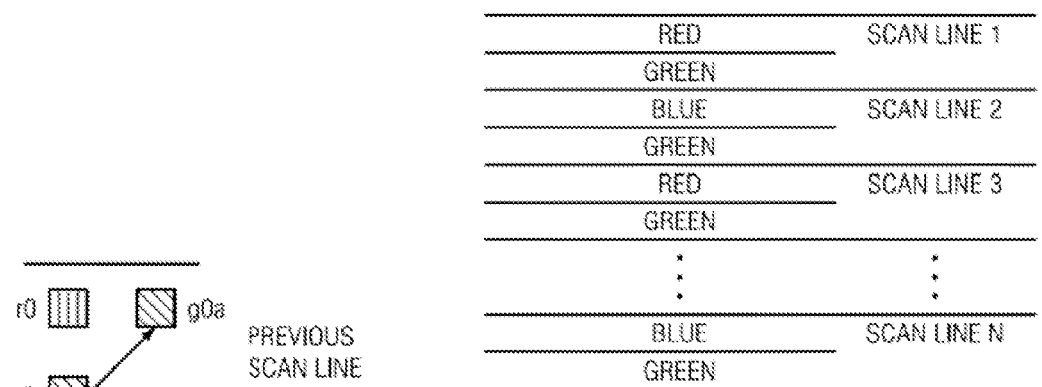
FIG. 2 is a diagram of the exposures for scan lines in an example embodiment of the invention.

FIGS. 1-3 and the following description depict specific examples to teach those skilled in the art how to make and use the best mode of the invention. For the purpose of teaching inventive principles, some conventional aspects have been simplified, or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

A scanner typically creates an image of an object by capturing a plurality of scan from the object. Each scan line is made up of a number of pixels. A complete color representation of an object typically requires three different color values for each pixel in the image. For example, in the RGB color space a pixel will be represented with a red value, a green value, and a blue value. In the digital domain each value may be represented by a defined number of bits, for example 8, 10, 12 or 16 bits. Therefore an image of an object will contain a number of scan lines, where each scan line has a plurality of pixels, and each pixel will have three color values.

When scanning an object with a broadband sensor, a scanner typically takes three exposures for each scan line, one exposure for each color. The scanner will illuminate the object with a different color of light for each exposure. The different colors of light are used in a defined sequence, for example first the red light, then the green light, then the blue light. In some scanners, the optical head (also called the carriage) remains stationary during all three exposures. When the optical head remains stationary, the three exposures are of the same physical area on the object being scanned. In other examples, the optical head remains in motion under a stationary scanned object during each exposure as in a flatbed scanner, or the scanned object is moved across a stationary optical head, as in an automatic document feeder. Therefore the three exposures are for adjacent regions on the object being scanned. The three different exposures will be combined into one scan line in the scanner.

FIG. 1 is a block diagram of scanner 100 in an example embodiment of the invention. Scanner 100 has a controller 102, a scan head 104 and a drive system 106. Controller 102 is coupled to scan head 104 and drive system 106 and controls the scanner. Controller 102 may comprise a processor, an ASIC, I/O module, memory and the like. The memory may comprise both volatile and non-volatile memory. Code stored in the memory, when executed by the processor, causes the scanner to perform functions, tor example scanning. Drive system 106 is mechanically coupled to scan head 104 and moves scan head 104 during scanning.

Scan head 104 may comprise a sensor army and one or more light sources. Scan head 104 may comprise a contact image sensor (CIS) or may have a charged coupled device (CCD) with folded optics. In this example, scan head 104 has a single unaltered sensor, typically called a broadband sensor, and three sets of different color light sources. The scanner may have an IR cut filter to prevent non-visible IR light from hitting the unfiltered sensor. In this example the light sources are different colored light emitting diodes (LED). The broadband sensor can detect a broad frequency range of visible light reflected from the object to be scanned. The three sets of different color LED's are alternately strobed by the controller 102 to illuminate the object to be scanned. By alternately strobing the three different colors of light, the broadband sensor can be used to detect three different colors from the object to be scanned. Typically, the three sets of LED's are red, green and blue (RGB). But three colors in a different color space could be used, for example cyan, yellow and magenta (CYM).

In one example embodiment of the invention, scanner 100 will only take two exposures per scan line. One color of light is used for one of the exposures in every scan line. The color used in every scan line will be called the reference color. The other two colors of light are alternated between scan lines. FIG. 2 is a diagram of the exposures for scan lines in an example embodiment of the invention.

FIG. 2 shows a plurality of scan lines 1-N. Each scan line contains two exposures using two different colors of light. In this example green is the reference color so every scan line has one exposure using green light. The other two colors (Red and Blue) are used every other scan line. Scan line 1 has one exposure using red light and one exposure using green light Scan line 2 has one exposure using blue light and one exposure using green light. Scan line 3 has one exposure using red light and one exposure using green light, and so on. The exposure sequence for the scan lines is RGB-GRGBG . . . Because each scan line requires only two exposures, the scanner can scan an object faster than scanners that use three exposures per scan line.

Each scan line in FIG. 2 only captures two different colors for each pixel in the scan line. Because a full color representation of an object requires three different color values for each pixel in the scan line, every pixel in each of the scan lines are missing a color value. The odd numbered scan lines are missing blue values and the even numbered scan lines are missing red values. The missing color values for each scan line can be reconstructed in a number of ways.

Figure 3A:
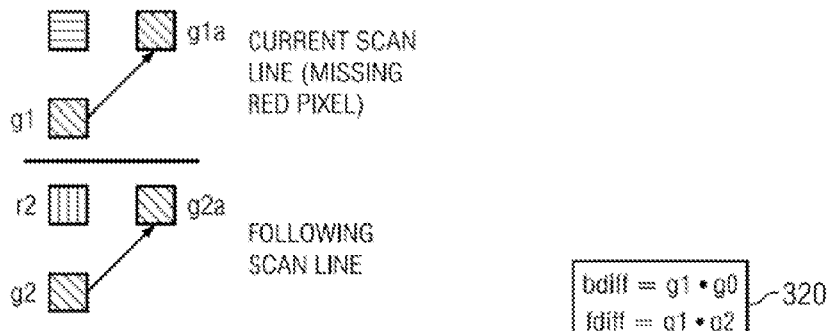
FIG. 3a is an example scan line sequence in an example embodiment of the invention.

In one example embodiment of the invention, information from the reference channel is used to guide the reconstruction of the missing color channels. The green color is one choice for the full-resolution reference channel since it most closely represents luminance and therefore best preserves scan resolution detail. FIG. 3a is an example scan line sequence in an example embodiment of the invention. In FIG. 3a the green color scan line has been chosen as the reference color channel.

The missing color pixel value within a scan fine is reconstructed in the following fashion. Reference color scan line pixels are aligned with current missing pixel color scan line by "shifting" the reference line pixels up or down by one half of a scan line. So the green pixel value in the previous scan line g0 is moved up by one half of a scan line and becomes green pixel aligned g0a. The green pixels in the current scan line g1 becomes g1a and the green pixels in the following scan line g2 become g2a. In one example implementation, moving or shifting the pixels by one half a scan line is performed using a bi-cubic spline filter, but similar results can be accomplished by any appropriate filter. Once shifted, the green pixels are "aligned" to the corresponding red and blue pixels from she same scan line. This compensates for the motion of the scan head during the exposures for each scan line.

Figure 3B:
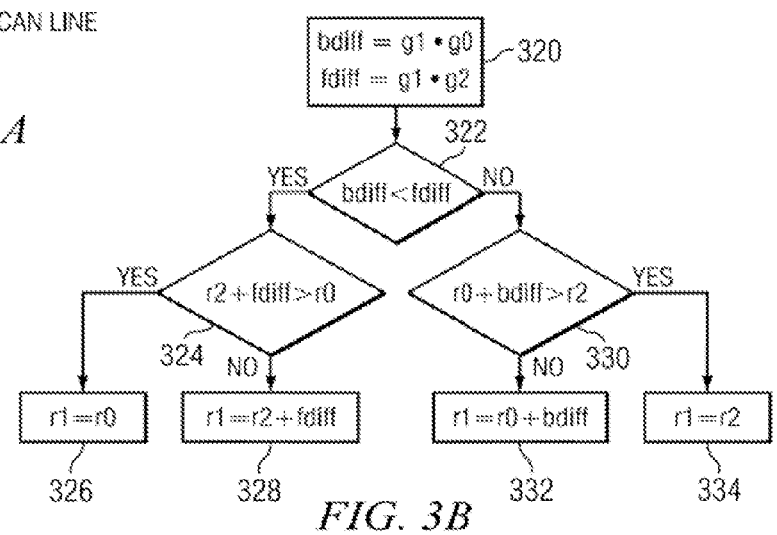
FIG. 3b is a flow chart of a reconstruction algorithm in an example embodiment of the invention.

FIG. 3b is a flow chart of the reconstruction algorithm in an example embodiment of the invention. Once the reference pixels have been aligned, the reconstruction algorithm starts at step 320. For clarity the "a" for aligned has been dropped from the pixel symbols. For each scan line, reference backward and forward differences are calculated. Reference backward difference (bdiff) is defined as the difference between the reference pixel in the current scan line and the reference pixel in the previous scan line. Reference forward difference (fdiff) refers to the difference between the reference pixel in the current scan line and the reference pixel in the following scan line. So for the current scan line bdiff=g1−g0 and fdiff is equal to g1−g2. For the current scan line, the red pixel value is being reconstructed.

At step 322 bdiff is compared to fdiff. If bdiff is smaller than fdiff flow continues at step 324, otherwise flow continues at step 330. At step 324 the sum of the pixel value of the color being reconstructed from the following scan line r2 and fdiff is calculated (sum=r2+fdiff). This sum is compared to she value of the color being reconstructed from the previous scan line (i.e. r0). If this sum is greater than the value of the color being reconstructed from the previous scan line (i.e. sum>r0), flow continues at step 326. Otherwise flow continues at step 328. At step 326, when r2+fdiff>r0 the reconstructed pixel is set to the value front the previous scan line, i.e. r1 is set equal to r0. At step 328, when r2+fdiff was not greater than r0, the reconstructed pixel value is set to the value of the sum, i.e. r1 is set equal to r2+fdiff.

At step 330 when bdiff is greater than fdiff, the sum of the pixel value of the color being reconstructed from the previous scan line r0 and bdiff is calculated (sum=r0+bdiff). The sum is compared to the value of the color being reconstructed from the following scan line (i.e. r2). If this sum is greater than the value of the color being reconstructed from the following scan line (i.e. sum>r2), flow continues at step 334. Otherwise flow continues at step 332. At step 334, when r0+bdiff>r2 the reconstructed pixel is set to the value from the following scan line, i.e. r1 is set equal to r2. At step 332, when r0+bdiff was not greater than r2, the reconstructed pixel value is set to the value of the sum, i.e. r1 is set equal to r0+bdiff.

In another example embodiment of the invention, the pixel values of the missing colors are reconstructed using reference forwards and backwards differences and reference forwards and backwards ratios. First the reference color scan line pixels are aligned with current missing pixel color scan line by "shifting" the reference line pixels up or down by one half of a scan line. In this example green is the reference color and the missing color is red (see FIG. 3). So the green pixel value in the previous scan line g0 is moved up by one half of a scan line and becomes green pixel aligned g0a. The green pixels in the current scan line g1 becomes g1a and the green pixels in the following scan line g2 become g2a. In one example implementation, moving or shifting the pixels by one half a scan line is performed using a bi-cubic spline filter.

Once the reference pixels have been aligned, for each scan line, reference backward and forward differences are calculated. For clarity the "a" for aligned has been dropped from the pixel symbols. Reference backward difference (bdiff) is defined as the difference between the reference pixel in the current scan line and the reference pixel in the previous scan line. Reference forward difference (fdiff) refers to the difference between the reference pixel in the current scan line and the reference pixel in the following scan line. So for the current scan line bdiff=g1−g0 and fdiff is equal to g1−g2.

Reference backwards and reference forward ratios are also calculated. Reference backward ratio (bratio) is defined as the ratio between the reference pixel in the current scan line and the reference pixel in the previous scan line. Reference forward ratio (fratio) refers to the difference between the reference pixel in the current scan line and the reference pixel in the following scan line. So for the current scan line bratio=g1/g0 and fratio=g1/g2.

To determine the pixel value of the missing color (red in this example) the reference backwards difference is compared to the reference forwards difference. When bdiff is smaller than fdiff the product of the pixel value of the color being reconstructed from the following scan line r2 and fratio is calculated (product=r2*fratio). When the product (r2*fratio) is greater than the same color pixel value in the previous scan line r0, r1 is set equal to r0. Otherwise r1 is set equal to the product r2*fratio.

When bdiff is not smaller than fdiff the product of the pixel value of the color being reconstructed from the previous scan line r0 and bratio is calculated (product=r0*bratio). When the product (r0*bratio) is greater than the same color pixel value in the following scan line, or r0*bratio>r2, r1 is set equal to r2. Otherwise r1 is set equal to the product r0*bratio. Other methods may also be used to reconstruct the pixel values of the missing colors.

What is claimed is:

1. A scanner, comprising:
   a broadband sensor to sense light from an object to be scanned;
   three lights to direct light onto the object to be scanned, each light producing light of a different color;
   a controller to control the scanner, the controller coupled to the three lights and the broadband sensor, the controller to capture a plurality of scan lines from the object to be scanned;
   the controller using a first color of light to capture each of the plurality of scan lines;
   the controller alternating between a second color of light and a third color of light to capture the plurality of scan lines, such that each of the plurality of scan lines has been captured using only two of the three different colors of lights, wherein each of the plurality of scan lines comprises pixel values for the two colors used to illuminate the scan line, and where the controller reconstructs pixel values for a third color for each scan line, wherein the third color is the color of light that was not used to illuminate that scan line.

2. The scanner of claim 1, wherein the three lights are light emitting diodes (LED).

3. The scanner of claim 1, wherein the three colors are red, green and blue.

4. The scanner of claim 1, wherein the pixel values for the third color for each scan line are reconstructed using reference forward and reference backward differences.

5. The scanner of claim 4, wherein the pixel values for the third color each scan line are reconstructed using reference forward, and reference backward ratios.

6. The scanner of claim 1, wherein the first color used to illuminate every one of the plurality of scan lines is green.

7. A method of scanning an object, comprising:
  capturing a first exposure of a first scan line illuminated with a reference color and capturing a second exposure of the first scan line illuminated with a first of two alternate colors;
  capturing a first exposure of a second scan line illuminated with the reference color and capturing a second exposure of the second scan line illuminated with a second of the two alternate colors, such that each of the first scan line and the second scan line has been captured using only the reference color and one of the two alternate colors;
  performing capturing of a first exposure of a first scan line and capturing a first exposure of a second scan line, repeatedly, until the object has been scanned;
  reconstructing values representing a third exposure of the first scan line for the second of the two alternate colors; and
  reconstructing values representing a third exposure of the second scan line for the first of the two alternate colors.

8. The method of claim 7, wherein the reconstructed values are reconstructed using reference forward and reference backward differences.

* * * * *